United States Patent
Woo et al.

(10) Patent No.: US 9,001,102 B2
(45) Date of Patent: Apr. 7, 2015

(54) APPARATUS FOR SUPPLYING MULTI-OUTPUT POWER AND DISPLAY APPARATUS USING THE SAME

(75) Inventors: Won-myung Woo, Seoul (KR); Jin-hyung Lee, Anyang-si (KR); Sung-bum Jung, Yongin-si (KR); Sung-yong Joo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 424 days.

(21) Appl. No.: 13/494,460

(22) Filed: Jun. 12, 2012

(65) Prior Publication Data

US 2013/0106818 A1    May 2, 2013

(30) Foreign Application Priority Data

Oct. 27, 2011    (KR) .................. 10-2011-0110622

(51) Int. Cl.
 G09G 5/00    (2006.01)
 H02M 3/335    (2006.01)
 G06F 1/30    (2006.01)
 G06F 1/26    (2006.01)

(52) U.S. Cl.
 CPC ........... *H02M 3/33561* (2013.01); *G06F 1/305* (2013.01); *G06F 1/26* (2013.01)

(58) Field of Classification Search
 None
 See application file for complete search history.

(56) References Cited

U.S. PATENT DOCUMENTS

| 2007/0121350 A1* | 5/2007 | Duvnjak | ............... 363/21.01 |
| 2009/0134702 A1* | 5/2009 | Duvnjak | ............... 307/31 |
| 2011/0084949 A1* | 4/2011 | Chiu et al. | ............... 345/211 |

* cited by examiner

*Primary Examiner* — Joseph Haley
*Assistant Examiner* — Emily Frank
(74) *Attorney, Agent, or Firm* — Sughrue Mion, PLLC

(57) ABSTRACT

An apparatus for supplying multi-output power is provided. The apparatus for supplying multi-output power includes a an input power unit which generates an LLC resonance signal using direct current (DC) power, a main output power unit which outputs a main voltage induced by the LLC resonance signal, a plurality of output power units which output secondary voltages induced by the LLC resonance signal at different level of voltages, and a first output power unit of the plurality of output power units outputs a respective one of the secondary voltages induced by the LLC resonance signal at a predetermined level of voltage using a different one of the secondary voltages output from a second output power unit of the plurality of output power units.

16 Claims, 4 Drawing Sheets

APPARATUS FOR SUPPLYING MULTI-OUTPUT POWER AND DISPLAY APPARATUS USING THE SAME

CROSS-REFERENCE TO RELATED APPLICATION

This application claims priority from Korean Patent Application No. 10-2011-0110622, filed Oct. 27, 2011 in the Korean Intellectual Property Office, the entire disclosure of which is incorporated herein by reference.

BACKGROUND OF THE INVENTION

1. Field of the Invention

Apparatuses and methods consistent with exemplary embodiments relate to supplying multi-output power and a display apparatus using the same and, more specifically, to supplying multi-output power which provides necessary power by converting a single input power of first order into a plurality of output powers of second order, and a display apparatus using the same.

2. Description of the related Art

An apparatus for supplying multi-output power refers to an apparatus which provides necessary power by converting a single input power of first order into a plurality of output powers of second order.

Recently, flat display apparatuses such as a plasma display panel (PDP) and a liquid crystal display (LCD) have become highly integrated and the related industry makes all out efforts to make a compact and light apparatus for supplying multi-output power.

However, as every output voltage of an apparatus for supplying multi-output has to be variable, the apparatus has circuits with complex configurations and needs a number of components, so it is difficult to make the apparatus compact and light.

A common apparatus for supplying multi-output power controls output of an input power unit using feedback in order to control an output voltage of a main output power unit. But, in this case, if output of an input power unit of first order changes, output of a plurality of output power units of second order changes as well so an additional circuit such as a linear regulator is added to a plurality of output power units in order to obtain voltage variable alone regardless of a main output power unit.

A linear regulator refers to a voltage-variable circuit with the simplest configuration which is usually used as a voltage drop circuit when output voltage is lower than input voltage.

However, it is difficult to make a compact apparatus for supplying multi-output power as the apparatus needs an additional circuit which generates a driving voltage applied to a gate of a metal-oxide-semiconductor field-effect transistor (MOSFET) in order to operate a MOSFET included in a linear regulator.

In addition, as voltage applied to a linear regulator is high voltage, expensive high-voltage components should be used in a linear regulator, leading to increased costs.

For instance, power for a PDP needs output voltage of about 5EA (200V, 60V, 5V, 15V, STBY) and a specialized output voltage ranging from 60V to 200V in order to prevent a panel from being discharged. Provided that output voltage of a main output power unit is 200V and that one of a plurality of output power unit is 60V, a voltage higher than that of a plurality of output units is needed to operate a gate of a MOSFET, and thus, an additional output power unit should be added to operate a gate of a MOSFET. In other words, as voltage for operating a gate of a MOSFET ranges from 10V to 15V, it is needed to design an output power unit outputting voltage of about 75V. Since power for a PDP does not include an output power unit outputting voltage of 75V, an additional output power unit needs to be designed.

Accordingly, as an additional circuit generating a driving voltage which is applied to a gate of a MOSFET is needed, it is difficult to make a compact apparatus for supplying multi-output power.

In addition, as voltage applied to a linear regulator is higher than 60V, expensive high-voltage components should be used in a linear regulator, leading to increased costs.

SUMMARY OF THE INVENTION

Exemplary embodiments address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide an apparatus for supplying multi-output power which does not need an additional circuit generating a driving voltage applied to a gate of a MOSFET, and realizes inexpensive low-voltage components by reducing internal pressure compared to components used in an apparatus for supplying multi-output power.

According to an aspect of an exemplary embodiment, there is provided an apparatus for supplying multi-output power, which includes an input power unit which generates a LLC resonance signal using a direct-current (DC) power, a main output power unit which outputs a main voltage induced by the LLC resonance signal, and a plurality of output power units which output secondary voltages induced by the LLC resonance signal at different level of voltages, and a first output power unit of the plurality of output power units outputs a respective one of the secondary voltages induced by the LLC resonance signal at a predetermined level of voltage using a different one of the secondary voltages output from a second output power unit of the plurality of output power units.

The input power unit may include a first switching device and a second switching device which are connected in series, a first winding connected with both of the first switching device and the second switching device, a first capacitor connected between the first winding and the second switching device, and a feedback control unit which controls an operation of the first switching device and the second switching device.

The input power unit may resonate by a plurality of switching devices and a first capacitor which are connected with a first winding.

The main output power unit may include a second winding and a third winding which generate induced current by the LLC resonance signal, a first diode which rectifies voltage generated from the second winding, a second diode which rectifies voltage generated from the third winding, a second capacitor which levels voltage rectified in the first and second diodes, an output unit which outputs an output voltage leveled by the second capacitor, and a feedback signal generating unit which compares the output voltage with a reference voltage, and sends a comparison result to the feedback control unit.

The main output power unit may include a second winding and third winding which are connected in series, a first diode connected with the second winding, a second diode connected with the third winding, a feedback signal generating unit connected with the first and second diodes and a second capacitor connected with the second winding in parallel One of the plurality of output power units may include a fourth winding and a fifth winding which generate induced current by the LLC resonance signal, a third diode which rectifies a voltage output from the fourth winding, a fourth diode which rectifies a voltage output from the fifth winding, a third capacitor applied with a first voltage rectified by the third diode, a fourth capacitor which levels the voltage rectified by the fourth diode, a regulator which converts the voltage leveled by the fourth capacitor into a second predetermined voltage using the different one of the secondary voltages output from the second output power unit, a fifth capacitor which is connected to the regulator and is applied with a second voltage output from the regulator, and an output terminal which outputs a third voltage which is the sum of the first voltage and the second voltage.

One of the plurality of output units may include a fourth winding and a fifth winding, a third capacitor connected with the fourth winding in parallel, a third diode connected between the fourth winding and the second capacitor, a fourth capacitor connected in parallel with the fifth winding, a fifth capacitor connected in parallel with the fifth winding, a fourth diode connected between the fifth winding and the fourth capacitor, and a regulator connected between the fourth capacitor and the fifth capacitor and the third capacitor and the fifth capacitor may be connected in series and share a node.

The regulator may include a third switching device and the third switching device may receive the different one of the secondary voltages output from the second output power unit through a gate end and converts the voltage leveled by the fourth capacitor into the second voltage.

The regulator may include a third switching device, a cathode of the fourth diode may be connected with a drain of the third switching device, and a gate of the third switching device may receive the different one of the secondary voltages output from the second output power unit.

A number of windings of the fourth winding may be greater than a number of wirings of the fifth winding.

A voltage difference between voltage applied with the fourth and fifth capacitors may be less than 2V.

The main output power unit and the plurality of output power units may include a first variable resistor which varies the main voltage in accordance with a resistor value of the first variable resistor, the plurality of output power units may include second variable resistors which vary the secondary voltages in accordance with resistor values of the second variable resistors.

According to an aspect of another exemplary embodiment, a display apparatus includes a display unit which displays an image, a control unit which controls the display unit, an apparatus for supplying multi-output power which supplies power to the display unit and the control unit, wherein the apparatus for supplying multi-output power comprises, an input power unit which outputs an LLC resonance signal using DC power, a main output power unit which outputs main power induced by the LLC resonance signal and a plurality of output power unit which output voltage induced by the LLC resonance signal as a different level of voltage, respectively, and one of the plurality of output power units outputs voltage induced by a LLC resonance signal as a predetermined level of voltage using voltage output from another output power unit.

The input power unit may include a first switching device and a second switching device which are connected in series, a first winding connected with both of the first switching device and the second switching device, a first capacitor connected between the first winding and the second switching device, and a feedback control unit which controls an operation of the first switching device and the second switching device.

The main output power unit may include a second winding and a third winding which generate induced current by the LLC resonance signal, a first diode which rectifies voltage generated from the second winding, a second diode which rectifies voltage generated from the third winding, a second capacitor which levels voltage rectified in the first and second diodes, an output unit which outputs an output voltage leveled by the second capacitor, and a feedback signal generating unit which compares the output voltage with a reference voltage, and sends a comparison result to the feedback control unit.

One of the plurality of output power units comprises a fourth winding and a fifth winding which generate induced current by the LLC resonance signal, a third diode and a fourth diode which rectify voltage output from the fourth and fifth diodes, respectively, a third capacitor applied with a first voltage rectified by the third diode, a fourth capacitor which levels voltage rectified by the fourth diode, a regulator which converts the voltage leveled by the fourth capacitor into a second predetermined voltage using the different one of the secondary voltages output from the second output power unit, a fifth capacitor which is connected to the regulator and is applied with a second voltage output from the regulator, and an output terminal which outputs a third voltage which is the sum of the first voltage and the and second voltage.

The regulator may include a third switching device and third switching device may receive voltage output from another output power unit through a gate end and convert voltage leveled by the fourth capacitor into the second voltage.

BRIEF DESCRIPTION OF THE DRAWINGS

The above and/or other aspects will be more apparent from the following detailed description of exemplary embodiments taken in conjunction with the accompanying drawings, in which.

DETAILED DESCRIPTION OF EXEMPLARY EMBODIMENTS

Hereinafter, certain exemplary embodiments will be described in greater detail with reference to the accompanying drawings.

Figure 1:
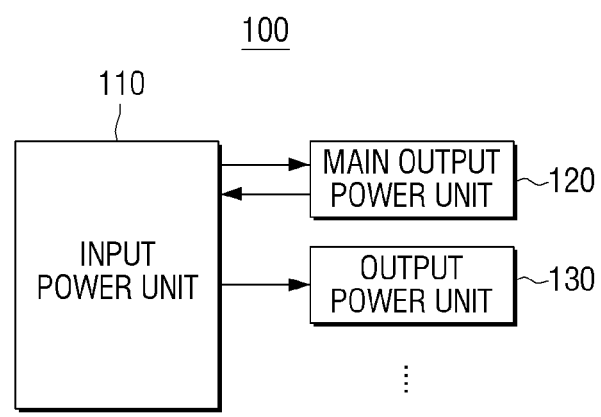
FIG. 1 is a block diagram of an apparatus for supplying multi-output power according to an exemplary embodiment.

FIG. 1 is a block diagram of an apparatus for supplying multi-output power according to an exemplary embodiment. Referring to FIG. 1, an apparatus for supplying multi-output power 100 includes an input power unit 110, a main output power unit 120 and a plurality of output power units 130.

The input power unit 110 generates power which is applied to the main output power unit 120 and the plurality of output power units 130. Specifically, the input power unit 110 may receive a direct current (DC) power and generate an inductorinductor-capacitor (LLC) signal which is applied to the main output power unit 120 and the plurality of output power units 130.

The input power unit 110 may include first and second switching devices connected in series, a first winding connected with both of the first and second switching devices, a first capacitor connected between the first winding and the second switching device and a feedback control unit controlling operation of the first and second switching devices.

The input power unit 110 may operate as follows.

The input power unit 110 may generate a LLC resonance signal by a switching movement of the first and second switching devices which operate in response to a complementary signal, respectively, and the first capacitor.

The input power unit 110 may include a resonant inductor connected with the first winding for LLC resonance.

The main output power unit 120 generates a main voltage. Specifically, it may generate voltage induced by a LLC resonance signal as the main voltage.

The main output power unit 120 may include second and third windings connected in series, a first diode connected with the second winding, a second diode connected with the third winding, a feedback signal generating unit connected with the first and second diodes and a second capacitor connected with the first and second diodes.

The first and second switching devices may be realized as a metal-oxide-semiconductor field-effect transistor (MOSFET) which performs a switching movement.

The main output power unit may operate as follows.

The second and third windings of the input power unit 100 may generate induced current by a LLC resonance signal. The first diode may rectify voltage output from the second winding. The second diode may rectify voltage output from the third winding. The second capacitor may level voltage rectified in the first and second diodes. An output unit may output voltage leveled by a second capacitor. The feedback signal generating unit may compare a voltage output from the output unit with a reference voltage and send the result of comparison to the feedback control unit inside of the input power unit 110. Further detail of specific operation of the feedback signal generating unit and the feedback signal control unit will be described afterward with reference to FIG. 2.

The main output power unit 120 is configured with full-wave rectification circuits using a plurality of diodes but it may be configured with half-wave rectification circuits using a single diode.

The plurality of output power units 130 outputs a different level of voltage, respectively. Specifically, the plurality of output power units 130 may output voltage induced by a LLC resonance signal generated in the input power unit 110 as a different level of voltage.

One of the plurality of output power units 130 may output a voltage induced by a LLC resonance signal generated in the input power unit 110 as a predetermined level of voltage.

One of the plurality of output power units 130 may include fourth and fifth windings, a third capacitor connected with the fourth winding in parallel, a third diode connected between the fourth winding and the third capacitor, fourth and fifth capacitors connected with the fifth winding in parallel, the third diode connected between the fifth winding and the fourth capacitor and a regulator connected between the fourth and fifth capacitors. The third and fifth capacitors may be connected in series by sharing a node.

One of the plurality of output power units 130 may operate as follows.

Specifically, the fourth and fifth windings may generate induced current by a LLC resonance signal which is generated in the input power unit 110. The third and fourth diodes may rectify voltage output from the fourth and fifth windings, respectively. The third capacitor may level voltage rectified by the third diode and be applied with a first voltage. The fourth capacitor may level voltage rectified by the fourth diode. The regulator may convert voltage applied to the fourth capacitor into a predetermined voltage using voltage output from another output unit. The fifth capacitor may level a predetermined voltage and be applied with a second voltage. An output terminal may output a third voltage which is the sum of the first and second voltages.

The regulator may include the third switching device, a cathode of the fourth diode may be connected with a drain of the third switching device and voltage output from another output power unit may be connected with a gate of the third switching device.

The third switching device may receive voltage output from another output power unit through a gate end and convert voltage leveled by the fourth capacitor into the second voltage.

The third switching device may be realized as a MOSFET which performs a switching movement. One of the plurality of output power units 130 is configured with half-wave rectification circuits using a single diode but it may be configured with full-wave rectification circuits using a plurality of diodes.

The number of windings of the fourth winding may be greater than that of the fifth.

The voltage difference between voltage applied with the fourth and the fifth capacitors is less than 2V.

The main output power unit and the plurality of output power units may include a variable resistors VR3 and VR4, respectively, and output voltages Vout 01 and Vout 02 from the main output power unit and the plurality of output power units may be variable in accordance with a resistor values of the variable resistors VR3 and VR4.

Details will be described with an example of power for a Plasma Display Panel (PDP).

Among output voltage of 5EA (200V, 60V, 5V, 15V, STBY) used for a PDP, output voltage from the main output power unit is assumed to be 200V to generate 200V and 60V needed to be changed to prevent a panel from being discharged, and output of one of the plurality of output power units is assumed to be 60V. The extent to which voltage can be variable is set by less than 2V because voltage rectified by the fourth diode after being output from the fifth winding is always higher than the second voltage and, in this case, the voltage difference between them should be minimized to prevent overheating lead by voltage loss of the third switching device.

Voltage rectified by the third diode after being output from the fourth winding is applied as the first voltage, voltage rectified by the fourth diode after being output from the fifth winding is converted by the regulator into a predetermined voltage, and voltage predetermined by the fifth capacitor is applied as the leveled second voltage. Details will be described with examples of numbers. For example, if the number of windings of the fourth and fifth windings are set to the extent that the first voltage is 57V and the second voltage is 3V in order to generate output voltage of 60V from one of the plurality of output power units 130, a third voltage of 60V is output since the third capacitor and the fifth capacitor are connected in series.

In this case, power for operating the switching device included in the regulator can use 15V among output powers of the PDP and additional power for the regulator doesn't need to be added, leading to a minimized size of the apparatus for supplying multi-output power and reducing costs. If the voltage applied to the fourth capacitor is set to 5V in accordance with the number of windings of the fifth winding, and the second voltage is output as 3V by the regulator, 15V can be used to operate a gate of the third switching device. Generally, voltage for operating a gate of the third switching device is between 10V and 15V. As 15V is used as output power for the PDP, an additional power isn't needed.

In this case, as voltage applied to the regulator is low voltage, inexpensive low-voltage components can be used by reducing internal pressure compared to components used in related-art apparatuses for supplying multi-output power. If this method is applied to power for displaying apparatuses, such as a PDP, which have been engaging in a fierce price competition, a inexpensive circuit with equal or better performance than existing circuits can be realized.

Figure 2:
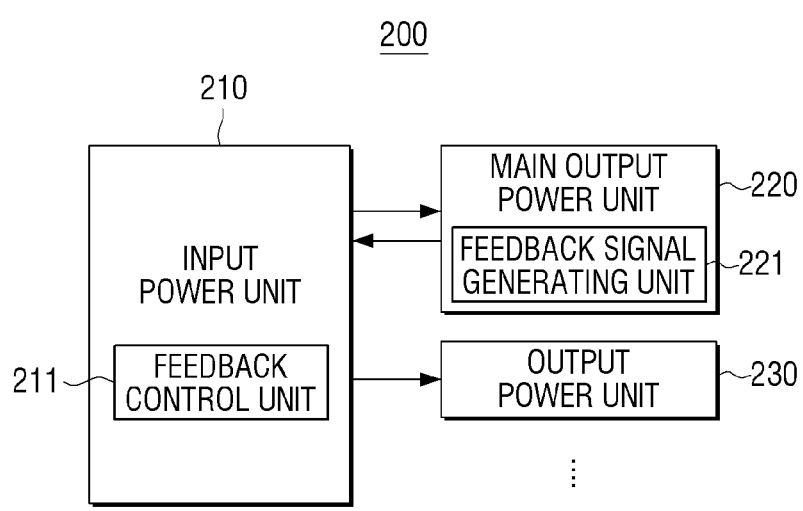
FIG. 2 is a block diagram of an apparatus for supplying multi-output power according to FIG. 1.

FIG. 2 is a block diagram of an apparatus for supplying multi-output power according to FIG. 1. Referring to FIG. 2, the apparatus for supplying multi-output power 200 includes an input power unit 210, a feedback control unit 211, a main output power unit 220, a feedback signal generating unit 221 and a plurality of output power units 230. Description of features of FIG. 2 which overlap with FIG. 1 will not be repeated.

The feedback control unit 211 controls the output of the input power unit 210.

Specifically, the feedback control unit 211 may control first and second switching devices of the input power unit 210 based on a feedback signal generated in the feedback signal generating unit 221.

The feedback control unit 211 may conduct pulse-width modulation (PWM) control and pulse-frequency modulation (PFM) control. In other words, if the feedback control unit 211 controls the first and second switching devices with a PWM control method, it can control output of the input power unit 210 by modulating a DUTY (i.e., duty ratio) of a pulse which is applied to the gates of the first and second switching devices. If the feedback control unit 211 controls the first and second switching devices with a PWM control method, it can control an output of the input power unit 210 by modulating a FREQUENCY of the pulse which is applied to the gates of the first and second switching devices.

The feedback signal generating unit 221 generates a feedback signal applied to the feedback control unit 211. Specifically, the feedback signal generating unit 221 detects an output voltage from the main output power unit 220, compares it with a reference voltage, generates a feedback signal determined from the comparison, and sends the feedback signal to the feedback control unit 211.

The feedback signal generating unit 221 operates as follows. The feedback signal generating unit 221 detects an output voltage from the main output power unit 220 using a plurality of resistors. The feedback signal generating unit 221 is supplied with a power signal from an external source. Accordingly, the feedback signal generating unit 221 generates a feedback signal based on the power signal sent from the external source. That is, the power signal from the external source is used as a reference voltage. A shunt regulator of the feedback signal generating unit 221 compares a detected output voltage from the main output power unit 220 with the reference voltage, such as 2.5V. The shunt regulator outputs the result of comparison through a photocoupler to a feedback control unit 211. Accordingly, if the output voltage from the main output power unit is set to 200V, a feedback signal can be generated which indicates that the output power is 200V.

In this case, the feedback signal generating unit 221 is set up to send a feedback signal to the feedback control unit 211 using a photocoupler but it can realized to send the signal directly instead of going through a photocoupler.

Figure 3:
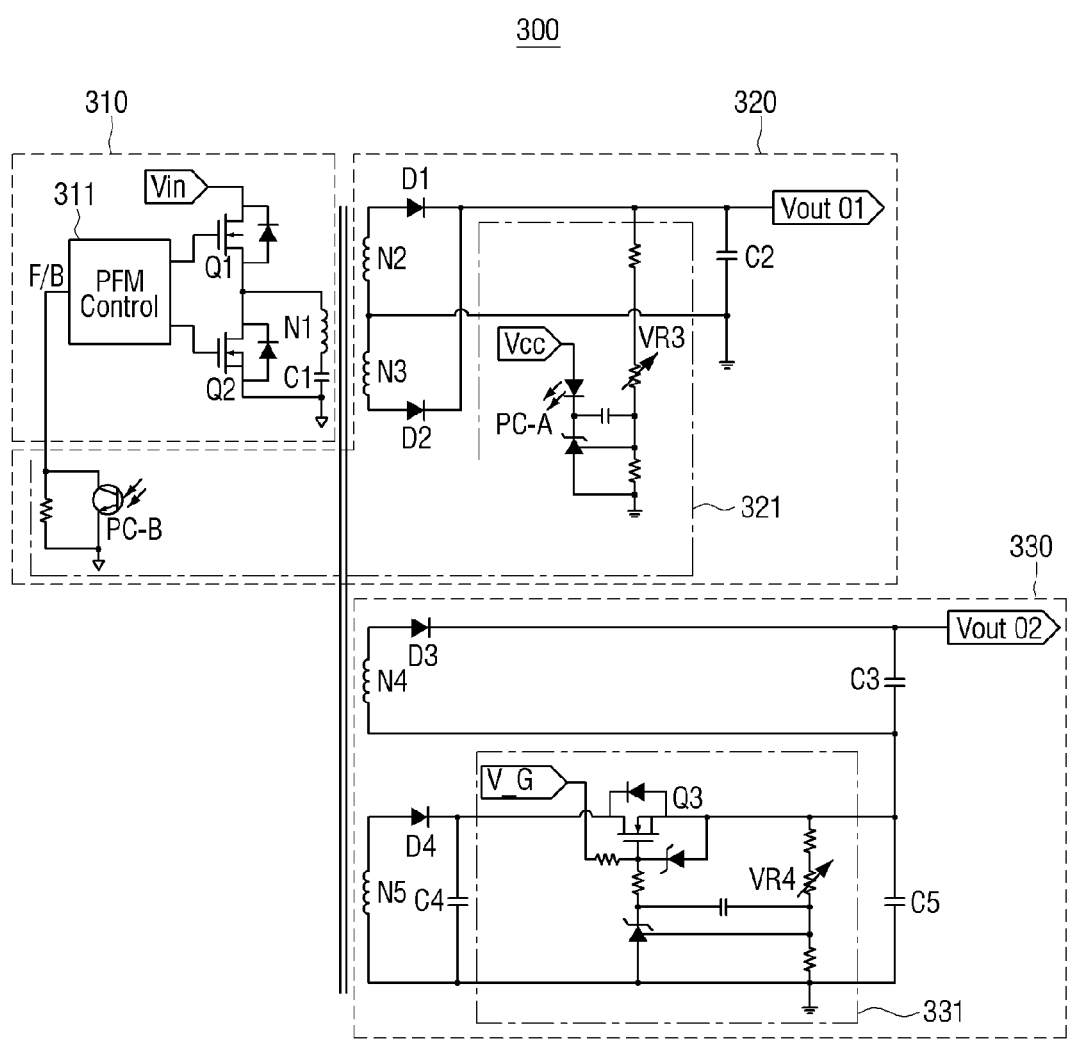
FIG. 3 is a circuit diagram of an apparatus for supplying multi-output power according to an exemplary embodiment.

FIG. 3 is a circuit diagram of an apparatus for supplying multi-output power according to an exemplary embodiment. Referring to FIG. 3, the apparatus for supplying multi-output power 300 includes an input power unit 310, a main output power unit 320 and a plurality of output power units 330. The input power unit 310 includes a feedback control unit 311, the main output power unit 320 includes a feedback signal generating unit 321, and one of the plurality of output power units 330 includes a regulator 331.

The input power unit 310 may include a first switching device Q1 and a second switching device Q2 connected in series, and a first winding N1 connected with both of the first and second switching devices, a first capacitor C1 connected between the first winding N1 and the second switching device Q2, and the feedback control unit 311.

The input power unit 310 may operate as follows.

The input power unit 310 may generate a LLC resonance signal by a switching movement of the first switching device Q1 and the second switching device Q2, which operate in response to a complementary signal, and the first capacitor C1.

The main output power unit 320 may include a second winding N2 and a third winding N3 connected in series, a first diode D1 connected with the second winding N2, a second diode D2 connected with the third winding N3, the feedback signal generating unit 321 connected with the first diode D1 and the second diode D2, and a second capacitor C2 connected with the first diode D1 and the second diode D2.

The main output power unit 320 may operate as follows.

The second winding N2 and the third winding N3 may generate induced current by an LLC resonance signal generated by the input power unit 310. The first diode D1 may rectify voltage output the second transformed winding N2. The second diode D2 may rectify voltage output from the third winding N3. The second capacitor C2 may level the voltage rectified in the first diode D1 and the second diode D2. An output unit Vout 01 may output the voltage leveled in the second capacitor C2 as an output voltage. The feedback signal generating unit 321 may compare the output voltage with a reference voltage, and send the comparison result to the feedback control unit 311 which is located inside of the input power unit 310.

One of the plurality of output power units 330 may include fourth and fifth windings N4, N5, a third capacitor C3 connected with the fourth winding N4 in parallel, a third diode D3 connected with the fourth winding N4 and the third capacitor C3, fourth and fifth capacitors C4, C5 connected with the fifth winding N5 in parallel, a fourth diode D4 connected between the fifth windings N5 and the fourth capacitor C4, and a regulator 331 connected between the fourth capacitor C4 and the fifth capacitor C5. The third capacitor C3 and the fifth capacitor C5 may be connected in series by sharing a node.

One of the plurality of output power units 330 may operate as follows.

Specifically, the fourth winding N4 and the fifth winding N5 may generate induced current by an LLC resonance signal generated in the input power unit 310. The third diode D3 and the fourth diode D4 may rectify voltage output from the fourth winding N4 and the fifth winding N5, respectively. The third capacitor C3 may level voltage rectified by the third diode D3 and the result may be applied as a first voltage. The fourth capacitor C4 may level voltage rectified by the fourth diode D4. The regulator 331 may convert voltage applied to the fourth capacitor C4 into a predetermined voltage using voltage output from another output power unit. The fifth capacitor C5 may level voltage output from the regulator and the result may be applied as a second voltage. An output terminal Vout 02 may output a third voltage which is the sum of the first voltage and the second voltage.

The regulator 331 may include the third switching device Q3, a cathode of the fourth diode D4 may be connected to a drain of the switching device Q3 and a voltage V_G output from another output power unit may be connected to a gate of the switching device Q3.

The third switching device Q3 may receive a voltage V_G output from another output power unit through a gate end and convert voltage leveled by the fourth capacitor C4 into the second voltage.

Figure 4:
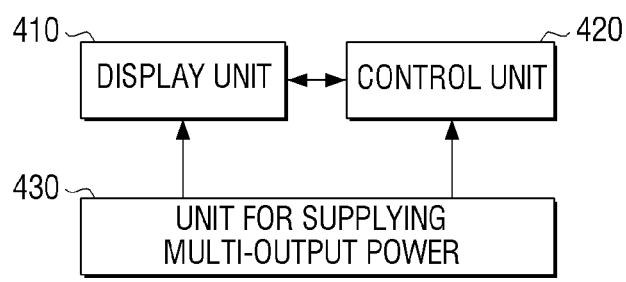
FIG. 4 is a block diagram of a display apparatus according to an exemplary embodiment.

FIG. 4 is a block diagram of a display apparatus according to an exemplary embodiment. Referring to FIG. 4, the display apparatus 400 includes a display unit 410, a control unit 420 and an for supplying multi-output power 430.

The display unit 410 displays an image.

The display unit 410 may be realized as at least one of a Liquid Crystal Display, a Thin Film Transistor-liquid Crystal Display, an Organic Light-emitting Diode, a Flexible Display and a three-dimensional (3D) display.

The control unit 420 controls the display unit.

The unit for supplying multi-output power unit 430 supplies powers to the display unit 410 and the control unit 420. The unit for supplying multi-output power 430 may be realized using the above-described apparatus for supplying multi-output power so further details will not be provided.

According to various exemplary embodiments, as inexpensive low-voltage components can be used by reducing internal pressure compared to the components used in a related art apparatus for supplying multi-output power so if this method is applied to power for display apparatuses, such as PDP, which are engaging in a fierce price competition, an inexpensive circuit can be realized.

According to the various exemplary embodiments, it is possible to minimize the size of and reduce the costs for an apparatus for supplying multi-output power.

The foregoing exemplary embodiments and advantages are merely exemplary and are not to be construed as limiting the present inventive concept. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An apparatus for supplying multi-output power built in a display apparatus, comprising:
an input power unit which generates an inductor-inductor-capacitor (LLC) resonance signal using direct current (DC) power;
a main output power unit which outputs a main voltage induced by the LLC resonance signal; and
a plurality of output power units which output secondary voltages induced by the LLC resonance signal at different level of voltages,
wherein a first output power unit of the plurality of output power units outputs a respective one of the secondary voltages induced by the LLC resonance signal at a pre-determined level of voltage using a different one of the secondary voltages output from a second output power unit of the plurality of output power units,
wherein the input power unit resonates by a plurality of switching devices and a first capacitor which are connected with a first winding.

2. An apparatus for supplying a multi-output power built in a display apparatus, comprising:
an input power unit which generates an inductor-inductor-capacitor (LLC) resonance signal using direct current (DC) power;
a main output power unit which outputs a main voltage induced by the LLC resonance signal; and
a plurality of output power units which output secondary voltage induced by the LLC resonance signal at different level of voltages,
wherein a first output power unit of the plurality of output power units outputs a respective one of the secondary voltage induced by the LLC resonance signal at a pre-determined level of voltage using a different one of the secondary voltage output from a second output power unit of the plurality of output power unit,
wherein the input power unit comprises:
a first switching device;
a second switching device connected in series with the first switching device;
a first winding connected to both of the first switching device and the second switching device;
a first capacitor connected between the first winding and the second switching device; and
a feedback control unit which controls an operation of the first switching device and the second switching device.

3. The apparatus as claimed in claim 2, wherein the main output power unit comprises:
a second winding which generates a first induced current which is induced by the LLC resonance signal;
a third winding which generates a second induced current which is induced by the LLC resonance signal;
a first diode which rectifies a voltage generated from the second winding;
a second diode which rectifies a voltage generated from the third winding;
a second capacitor which levels the voltages rectified in the first and the second diodes;
an output unit which outputs an output voltage leveled by the second capacitor; and
a feedback signal generating unit which compares the output voltage with a reference voltage, and sends a comparison result to the feedback control unit.

4. The apparatus as claimed in claim 2, wherein the main output power unit comprises;
a second winding;
a third winding which is connected to the second winding in series;
a first diode connected to the second winding;
a second diode connected to the third winding;
a feedback signal generating unit connected to the first and the second diodes; and
a second capacitor connected to the second winding in parallel.

5. The apparatus as claimed in claim 3, wherein the first output power unit of the plurality of output power units comprises:
a fourth winding which generates a first induced current which is induced by the LLC resonance signal;
a fifth winding which generates a second induced current which is induced by the LLC resonance signal;
a third diode which rectifies a voltage output from the fourth winding;
a fourth diode which rectifies a voltage output from the fifth winding;
a third capacitor applied with a first voltage rectified by the third diode;

a fourth capacitor which levels the voltage rectified by the fourth diode;
a regulator which converts the voltage leveled by the fourth capacitor into a second predetermined voltage using the different one of the secondary voltages output from the second output power unit;
a fifth capacitor which is connected to the regulator and is applied with a second voltage output from the regulator; and
an output terminal which outputs a third voltage which is the sum of the first voltage and the second voltage.

6. The apparatus as claimed in claim 3, wherein the first output power unit of the plurality of output units comprises:
a fourth winding;
a fifth winding;
a third capacitor connected in parallel with the fourth winding;
a third diode connected between the fourth winding and the third capacitor;
a fourth capacitor connected in parallel with the fifth winding;
a fifth capacitor connected in parallel with the fifth winding;
a fourth diode connected between the fifth winding and the fourth capacitor; and
a regulator connected between the fourth capacitor and the fifth capacitor,
wherein the third capacitor and the fifth capacitor are connected in series and share a node.

7. The apparatus as claimed in claim 5, wherein the regulator comprises a third switching device,
wherein the third switching device receives the different one of the secondary voltages output from the second output power unit through a gate end and converts the voltage leveled by the fourth capacitor into the second voltage.

8. The apparatus as claimed in claim 5, wherein the regulator comprises a third switching device,
wherein a cathode of the fourth diode is connected with a drain of the third switching device, and a gate of the third switching device receives the different one of the secondary voltages output from the second output power unit.

9. The apparatus as claimed in claim 5, wherein a number of windings of the fourth winding is greater than a number of wirings of the fifth winding.

10. The apparatus as claimed in claim 5, wherein a voltage difference between voltages applied to the fourth and the fifth capacitors is less than 2V.

11. An apparatus for supplying multi-output power built in a display apparatus, comprising:
an input power unit which generates an inductor-inductor-capacitor (LLC) resonance signal using direct current (DC) power;
a main output power unit which outputs a main voltage induced by the LLC resonance signal; and
a plurality of output power units which output secondary voltages induced by the LLC resonance signal at different level of voltages,
wherein a first output power unit of the plurality of output power units outputs a respective one of the secondary voltages induced by the LLC resonance signal at a predetermined level of voltage using a different one of the secondary voltages output from a second output power unit of the plurality of output power units,
wherein the main output power unit includes a first variable resistor which varies the main voltage in accordance with a resistor value of the first variable resistor, and the plurality of output power units include second variable resistors which vary the secondary voltages in accordance with resistor values of the second variable resistors.

12. A display apparatus including:
a display unit which displays an image;
a control unit which controls the display unit;
a multiple output power supply unit for supplying multi-output power which supplies power to the display unit and the control unit;
wherein the multiple output power supply unit comprises:
an input power unit which generates an inductor-inductor-capacitor (LLC) resonance signal using direct current (DC) power;
a main output power unit which outputs a main voltage induced by the LLC resonance signal; and
a plurality of output power units which output secondary voltages induced by the LLC resonance signal at different level of voltages,
wherein a first output power unit of the plurality of output power units outputs a respective one of the secondary voltages induced by the LLC resonance signal at a predetermined level of voltage using a different one of the secondary voltages output from a second output power unit of the plurality of output power units,
wherein the input power unit resonates by a plurality of switching devices and a first capacitor which are connected with a first winding.

13. A display apparatus including:
a display unit which displays an image;
a control unit which controls the display unit;
a multiple output power supply unit for supplying multi-output power which supplies power to the display unit and the control unit;
wherein the multiple output power supply unit comprises:
an input power unit which generates an inductor-inductor-capacitor (LLC) resonance signal using direct current (DC) power;
a main output power unit which outputs a main voltage induced by the LLC resonance signal; and
a plurality of output power units which output secondary voltages induced by the LLC resonance signal at different level of voltages,
wherein a first output power unit of the plurality of output power units outputs a respective one of the secondary voltages induced by the LLC resonance signal at a predetermined level of voltage using a different one of the secondary voltages output from a second output power unit of the plurality of output power units,
wherein the input power unit comprises:
a first switching device;
a second switching device connected in series with the first switching device;
a first winding connected to both of the first switching device and the second switching device;
a first capacitor connected between the first winding and the second switching device; and
a feedback control unit which controls an operation of the first switching device and the second switching device.

14. The display apparatus as claimed in claim 13, wherein the main output power unit comprises:
a second winding which generates a first induced current which is induced by the LLC resonance signal;
a third winding which generates a second induced current which is induced by the LLC resonance signal;

a first diode which rectifies a voltage generated from the second winding;

a second diode which rectifies a voltage generated from the third winding;

a second capacitor which levels the voltages rectified in the first and the second diodes;

an output unit which outputs an output voltage leveled by the second capacitor; and a feedback signal generating unit which compares the output voltage with a reference voltage, and sends a comparison result to the feedback control unit.

15. The display apparatus as claimed in claim 14, wherein one of the plurality of output power units comprises:

a fourth winding which generates a first induced current which is induced by the LLC resonance signal;

a fifth winding which generate a second induced current which is induced by the LLC resonance signal;

a third diode which rectifies a voltage output from the fourth winding;

a fourth diode which rectifies a voltage output from the fifth winding;

a third capacitor applied with a first voltage rectified by the third diode;

a fourth capacitor which levels the voltage rectified by the fourth diode;

a regulator which converts the voltage leveled by the fourth capacitor into a second predetermined voltage using the different one of the secondary voltages output from the second output power unit;

a fifth capacitor which is connected to the regulator and is applied with a second voltage output from the regulator; and an output terminal which outputs a third voltage which is the sum of the first voltage and the and second voltage.

16. The display apparatus as claimed in claim 15, wherein the regulator comprises a third switching device, wherein the third switching device receives the different one of the secondary voltages output from the second output power unit through a gate end and converts the voltage leveled by the fourth capacitor into the second voltage.

* * * * *